United States Patent
Clymans et al.

(10) Patent No.: US 10,835,882 B2
(45) Date of Patent: Nov. 17, 2020

(54) APPARATUS AND PROCESS FOR HIGH PRESSURE POLYMERIZATION OF ETHYLENE

(71) Applicant: ExxonMobil Chemical Patents Inc., Baytown, TX (US)

(72) Inventors: Paul J. Clymans, Kapelle-op-den-Bos (BE); Henri A. Lammens, Antwerp (BE); Philip H. Cornelissen, Heverlee (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 149 days.

(21) Appl. No.: 16/065,317

(22) PCT Filed: Jan. 6, 2017

(86) PCT No.: PCT/US2017/012422
§ 371 (c)(1),
(2) Date: Jun. 22, 2018

(87) PCT Pub. No.: WO2017/146823
PCT Pub. Date: Aug. 31, 2017

(65) Prior Publication Data
US 2019/0299182 A1 Oct. 3, 2019

Related U.S. Application Data

(60) Provisional application No. 62/300,367, filed on Feb. 26, 2016.

(30) Foreign Application Priority Data

Apr. 29, 2016 (EP) .................................. 16167667

(51) Int. Cl.
*C08F 2/00* (2006.01)
*C08F 10/02* (2006.01)
*B01J 3/04* (2006.01)

(52) U.S. Cl.
CPC ............... *B01J 3/042* (2013.01); *B01J 3/044* (2013.01); *C08F 10/02* (2013.01)

(58) Field of Classification Search
CPC .................................. C08F 2/01; C08F 10/02
See application file for complete search history.

(56) References Cited

U.S. PATENT DOCUMENTS

| 3,628,918 A | 12/1971 | Beals et al. | |
| 6,673,878 B2* | 1/2004 | Donck | B01J 19/2415 422/132 |
| 7,582,709 B2* | 9/2009 | Goossens | B01J 19/2415 526/64 |

(Continued)

FOREIGN PATENT DOCUMENTS

| EP | 2481477 A | 8/2012 |
| WO | 2004/108271 A | 12/2004 |

(Continued)

*Primary Examiner* — Rip A Lee
(74) *Attorney, Agent, or Firm* — ExxonMobil Chemical Patents Inc.-Law Department

(57) ABSTRACT

Disclosed are an apparatus and a process for polymerizing ethylene under high pressure providing more than one injection point for one initiator injection pump.

16 Claims, 2 Drawing Sheets

(56) References Cited

U.S. PATENT DOCUMENTS

| | | | |
|---|---|---|---|
| 8,217,124 B2 * | 7/2012 | Littmann | C08F 10/02 |
| | | | 526/64 |
| 9,371,406 B2 * | 6/2016 | Cornelissen | C08F 2/01 |
| 9,611,343 B2 * | 4/2017 | Garland, Jr. | C08F 6/001 |
| 2005/0192414 A1 | 9/2005 | Donck et al. | |
| 2018/0244813 A1 * | 8/2018 | Lammens | C08F 10/02 |
| 2019/0299182 A1 * | 10/2019 | Clymans | B01J 3/02 |

FOREIGN PATENT DOCUMENTS

| | | |
|---|---|---|
| WO | 2007/018871 A | 2/2007 |
| WO | 2011/008197 A | 1/2011 |
| WO | 2012/117039 A | 9/2012 |
| WO | 2013/154690 A | 10/2013 |
| WO | 2014/046835 A | 3/2014 |

* cited by examiner

APPARATUS AND PROCESS FOR HIGH PRESSURE POLYMERIZATION OF ETHYLENE

CROSS-REFERENCE OF RELATED APPLICATIONS

This application is a National Phase Application of International Application No. PCT/US2017/012422, filed Jan. 6, 2017, which claims the benefit of U.S. Provisional Application No. 62/300,367, filed on Feb. 26, 2016 and EP Application No. 16167667.1 filed Apr. 29, 2016, the disclosures of which are incorporated herein by reference in their entireties.

FIELD OF THE INVENTION

The invention relates to an apparatus and a process for polymerizing ethylene under high pressure. In particular, the invention relates to an apparatus and a process providing more than one injection point for one initiator injection pump.

BACKGROUND OF THE INVENTION

High pressure reactors, such as tubular reactors and autoclaves, are used for the polymerization of ethylene at high pressure, for example, pressures of over 1000 bar (100 MPa), and up to 3000 bar (300 MPa) or higher. In such processes, fresh ethylene from an ethylene supply is compressed to reactor pressure and then combined, in the reactor, with initiators and any comonomers, if available, and is polymerized to give a mixture comprising principally polymer and unreacted monomer. That mixture leaves the reactor through a valve, generally referred to as a high pressure let down valve, and then enters a separation system in which unreacted monomer is separated from the polymer and recycled back to the suction of the secondary compressor where it is combined with the fresh ethylene from the primary compressor.

The initiator, typically an oxygen or organic free-radical initiator, is injected to the reactor system to initiate the polymerization reaction. Usually, a mixture of different organic peroxides with different half-life time temperatures is used in accordance with the desired reaction profile. The organic peroxide (mixture) is diluted in an inert organic solvent for reasons of safety and for easier handling and metering. The initiator (mixture) is injected at one or more points into the reactor to start the polymerization reaction. The injection is usually conducted by a high pressure initiator injection pump. One pump generally provided with one spare pump is used to inject the initiator into a reaction zone through one injection point. The pump output (initiator flow) is controlled by a temperature measured in the reactor (either a single temperature or the temperature from a peak picker in a reaction zone). See, for example, US patent application U.S. Pat. No. 3,628,918 or U.S. Publication No. 2005/0192414, WO 2004/108271, WO 2007/018871, WO 2011/008197, or WO 2013/154690. Other background references include EP 2 481 477 A and WO 2014/046835.

In the present invention, one injection pump is designed to inject initiators at more than one injection point. While maintaining initiator supply for each reaction zone, this inventive concept can increase the total output of each injection pump by removing the limitation of using at least one injection pump to feed only one reaction zone through one injection point, thus reducing the number of injection pumps needed, which can promote desired cost-effectiveness for high pressure reactor polymerization plants.

SUMMARY OF THE INVENTION

Provided are apparatus and processes for polymerizing ethylene under high pressure.

In one embodiment, the present invention encompasses an apparatus for high pressure polymerization of ethylene, comprising a high pressure reactor in which monomer is polymerized to form a product mixture comprising polymer and unreacted monomer, wherein the reactor is provided with more than one reaction zone and at least one injection pump in fluid connection with the reactor, wherein each injection pump fluidly connects to the reactor at more than one injection point. Preferably, the apparatus further comprises a primary compressor for compressing monomer to an intermediate pressure and a secondary compressor for compressing the monomer to the pressure of the reactor upstream of the reactor; a high pressure let down valve downstream of the reactor through which the product mixture from the high pressure reactor flows; a separation system downstream of the high pressure let down valve having at least two stages for separating the product mixture into polymer and unreacted monomer; and a recycle system for returning the unreacted monomer to the secondary compressor.

In another embodiment, the present invention relates to process for high pressure polymerization of ethylene, comprising the steps of: compressing monomer in a primary compressor to an intermediate pressure and then mixing the monomer with recycled monomer and further compressing the monomer in a secondary compressor to the pressure of the reactor upstream of the reactor; introducing the monomer into a high pressure reactor provided with more than one reaction zone; injecting an initiator into the reactor at more than one injection point by at least one injection pump, wherein each injection pump conducts injection at more than one injection point; contacting the monomer in the reactor with the initiator under high pressure polymerization conditions for polymerization to form a product mixture; releasing the product mixture through a high pressure let down valve, cooling the product mixture and separating the product mixture in a separation system having at least two stages into polymer and unreacted monomer; and recycling the unreacted monomer to the secondary compressor.

Preferably, the initiator is injected into the reactor in at least two, at least three, or at least four injection points. Preferably, the initiator is injected into different reaction zones in the same initiator composition. Preferably, the reactor is a tubular reactor, an autoclave, or a combination thereof.

DETAILED DESCRIPTION

Figure 1:
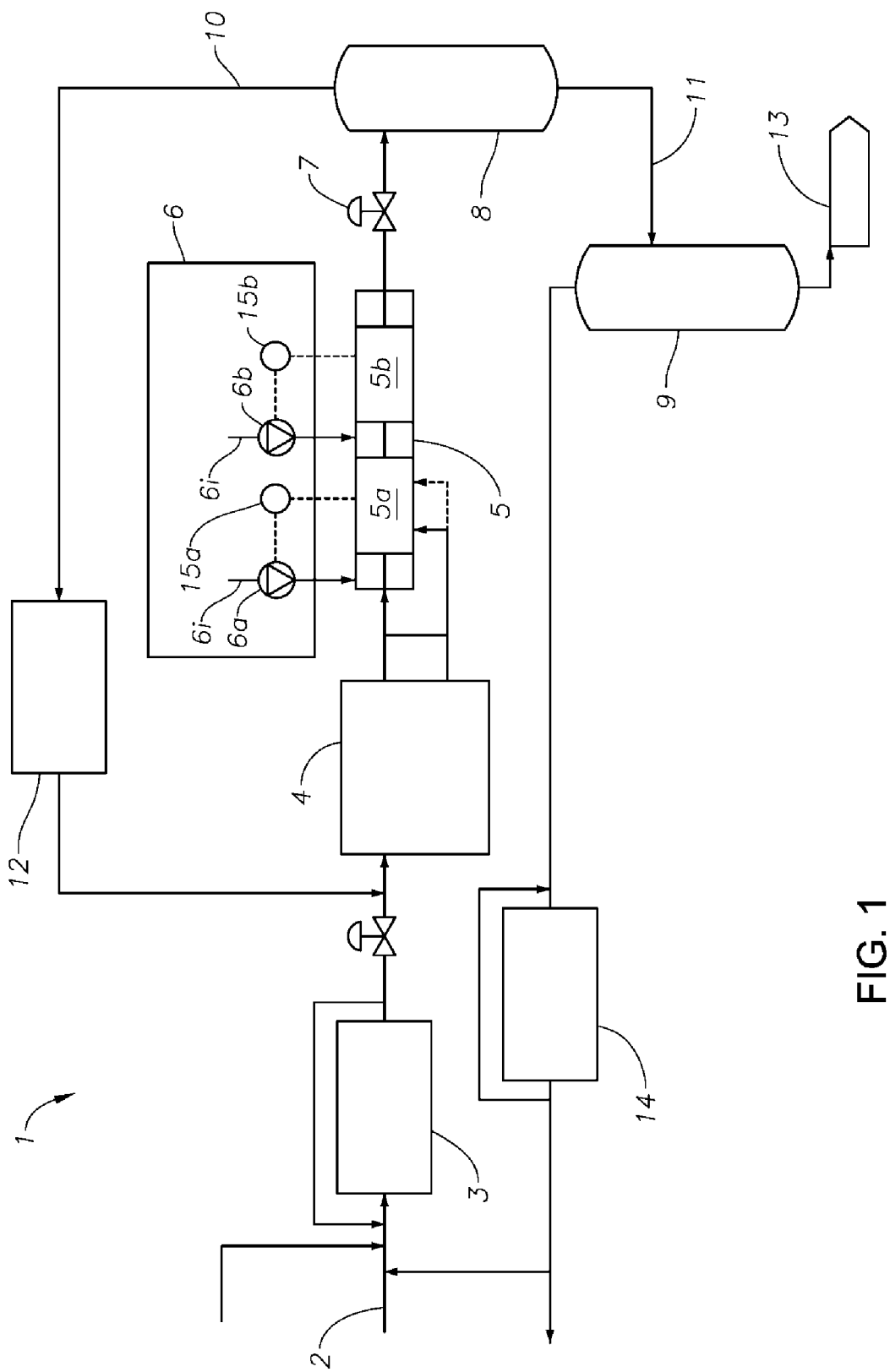
FIG. 1 depicts a schematic representation of a high pressure polymerization system with a conventional initiator injection scheme where one injection pump injects initiators into one reaction zone through one injection point.

Various specific embodiments, versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. The term "different" as used to refer to monomer units indicates that the monomer units differ from each other by at least one atom or are different isomerically. Likewise, the definition of polymer, as used herein, includes copolymers and the like.

As used herein, the term "monomer" refers to ethylene and to any mixture of ethylene with one or more comonomers. Thus, as used herein, the terms "polyethylene," "ethylene polymer," and "ethylene copolymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)).

As used herein, "high pressure polymerization" refers to a highly exothermic polymerization reaction that is performed in reactors, such as tubular reactors and autoclaves, under high reactor operating pressures, for example, of over 1000 bar (100 MPa), and up to 3000 bar (300 MPa) or higher.

Polymerization Initiator & Initiator Composition

Initiators are used to initiate the free radical polymerization of ethylene and optionally comonomer(s). Suitable initiators are organic peroxides. Usually, mixtures of different peroxides are used, the so-called "peroxide cocktails". Such a mixture of several peroxide initiators typically includes peroxides having different half-life times: generally ones that are active at the lowest temperature required for the given reaction start temperature (from about 120° C. to about 160° C.) and ones that are active at the highest temperature (up to about 335° C.) for the desired maximum temperature. Selection of an appropriate combination of different peroxides depends on the reactor-setup and the desired reaction temperature profile along the length of the reactor, and is within the general knowledge of a skilled person.

Organic peroxides useful as polymerization initiators are widely known in the art. Classes of peroxide initiators that are particularly useful for the present invention are, for example, the following: diacyl peroxides, dialkyl peroxydicarbonates, tert-alkyl peroxyesters, OO-tert-alkyl O-alkyl monoperoxycarbonates, di-tert-alkyl peroxides, di(tert-alkylperoxy)ketals, tert-alkyl hydroperoxides, and ketone peroxides.

Non-limiting examples of useful peroxides are, e.g. the following: dibenzoyl peroxide, dilauroyl peroxide, succinic acid peroxide, diisononanoyl peroxide, dioctanoyl peroxide, tert-butylperoxybenzoate, tert-butylperoxyacetate, tert-butylperoxymaleate, tert-butyl 2-ethylperoxyhexanoate, tert-butyl peroxy-3,5,5-trimethylhexanoate, tert-amyl 2-ethylperoxyhexanoate, 2,5-di(2-ethylhexanoyl-peroxy)2,5-dimethyl-hexane, tert-butylperoxypivalate, alpha-cumyl peroxyneoheptanoate, 3-hydroxy-1,1-dimethylbutyl peroxyneodecanoate, OO-tert-butyl-O-(isopropyl)monoperoxycarbonate, OO-tert-amyl-O-(2-ethylhexyl)monoperoxycarbonate, ethyl-3,3-di(tert-amylperoxy)butyrate, n-butyl-4,4-di(tert-butylperoxy)valerate, 1,1-di(tert-butylperoxy)cyclohexane, 2,2-di(tert-butylperoxy)butane, 1,1-di(tert-amylperoxy)cyclohexane, 2,5-di-(tert-butylperoxy)-2,5-dimethyl-3-hexyne, 2,5-di-(tert-butylperoxy)-2,5-dimethylhexane, 2,5-di(tert-butylperoxy)-2,5-dimethylhexane, 1,3(4)-bis(2-(tert-butyl-peroxy)-1-methylethyl)-benzene, di(tert-butyl)peroxide (DTBP), di(tert-amyl)peroxide, dicumylperoxide, tert-butyl cumyl peroxide, tert-butyl peroxyisopropylcarbonate, tert-butyl peroxyisobutyrate, di(n-propyl)peroxydicarbonate, di(sec-butyl)peroxydicarbonate, di(2-ethylhexyl)peroxydicarbonate, di(n-hexadecyl)peroxydicarbonate, di(4-tert-butylcyclohexyl)peroxydicarbonate, tert-butylhydroperoxide, tert-amylhydroperoxide, alpha-cumylhydroperoxide, 2,5-dihydroperoxy-2,5-dimethylhexane, para-menthane hydroperoxide, m/p-isopropyl-alpha-cumyl hydroperoxide. Such peroxides are marketed for example under the trade names Trigonox™ and Perkadox™ by AkzoNobel, or Luperox™ by Arkema.

Preferred initiator mixtures, especially for tubular reactors contain a minimum of one and up to five different types of initiators. Suitable mixtures of different organic peroxides, commonly referred to as peroxide cocktails, are known to those skilled in the art.

In a preferred embodiment according to the present invention, the initiator (or initiator mixtures) is injected into different reaction zones in the same initiator composition. The polymerization initiator composition used herein comprises at least one, preferably several, polymerization initiators as described above, dissolved in an organic solvent, as further described below, and optionally one or more additional modifiers, also as further described below.

Suitable organic solvents can include one or more non-coordinating, inert liquids including, but not limited to, straight and branched-chain hydrocarbons such as propane, isobutane, butane, pentane, isopentane, hexanes, isohexane, heptane, octane, n-octane, dodecane, isododecane, and mixtures thereof; cyclic and alicyclic hydrocarbons such as cyclohexane, cycloheptane, methylcyclohexane, methylcycloheptane, and mixtures thereof such as can be found commercially (Isopars™ from ExxonMobil); perhalogenated hydrocarbons such as perfluorinated $C_4$ to $C_{10}$ alkanes, chlorobenzene, and aromatic and alkylsubstituted aromatic compounds such as benzene, toluene, mesitylene, and xylene. Suitable solvents also include liquid olefins which may act as monomers or comonomers including ethylene, propylene, 1-butene, isobutylene, 1-hexene, 1-pentene, 3-methyl-1-pentene, 4-methyl-1-pentene, 1-octene, and 1-decene. In certain embodiments, the initiator can include butane, n-octane, or a mixture of one or more $C_9$ to $C_{12}$ paraffinic hydrocarbons.

The peroxide initiators (or initiator mixtures) may constitute from about 5 to about 50 wt % of the polymerization initiator composition, preferably from about 5 to about 40 wt %, more preferably from about 10 to about 40 wt %.

Optionally, in case an additional modifier (different from the initiator solvent) is used, such additional modifier as described above may be added to the reactor together with the monomer feed, or via one or more separate injection points. The amount of the transfer agent can be up to the concentration in the reaction mixture required to control the melt index of the product up to the required specification.

Preferably, the organic solvent as described above constitutes from about 50 to about 95 wt % of the entire solution comprising the peroxide(s) in the organic solvent, more preferably from about 65 to about 85 wt %, and most preferably from about 70 to about 85 wt %.

Based on the monomer feed (ethylene and optionally comonomer(s)), the one or more polymerization initiator(s) constitute from about 30 to about 1500 weight ppm, preferably from about 50 to about 1000 weight ppm.

The organic solvent in which the initiator is dissolved may be used in an amount corresponding to about 100 to about 5000 weight ppm, preferably about 250 to about 3000 weight ppm, with respect to the monomer feed.

The polymerization initiator compositions according to the present invention may further contain conventional additives, such as radical scavengers to stabilize the initiator composition during storage.

Modifier

The process of the present invention preferably involves use of a modifier. The terms "modifier", also used interchangeably herein as "chain transfer agent", refer to a component that can be added to the polymerization process to control the molecular weight of the polymer by promoting chain transfer.

Examples of modifiers can include, but are not limited to, tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-butene-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetonitrile, N-ethylacetamide, propylene, 1-butene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2,1-bromo-2-chloroethane, octene-1,2-methylbutene-2, cumene, butene-1, methyl vinyl sulfide, n-butyronitrile, 2-methyl-butene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1,1,2-dibromoethane, dimethylamine, benzaldehyde, chloroform, 2-ethylhexene-1, propionaldehyde, 1,4-dichlorobutene-2, tri-n-butylphosphine, dimethylphosphine, methyl cyanoacetate, carbon tetrachloride, bromotrichloromethane, di-n-butylphosphine, acetaldehyde, proprionaldehyde, and phosphine. Further details and other suitable transfer agents are described in Advances in Polymer Science, Vol. 7, pp. 386-448 (1970).

Preferably, the polyethylene produced by the apparatus described herein or according to the process as described herein contains one or more $C_2$ to $C_{12}$ unsaturated modifiers. The $C_2$ to $C_{12}$ unsaturated modifiers contain at least one unsaturation, but can also contain multiple conjugated or non-conjugated unsaturations. In case of multiple unsaturations, it is preferred that they are non-conjugated. In certain embodiments, the unsaturation of the $C_2$ to $C_{12}$ unsaturated modifier can be di-substituted with one or more alkyl groups in the beta position. Preferred $C_2$ to $C_{12}$ unsaturated modifiers include propylene, isobutylene, or a combination thereof. The amount of the modifier(s) can range from a low of about 0.1 wt %, 0.3 wt %, or 0.8 wt % to a high of about 3.0 wt %, 6.0 wt %, or 10.0 wt %, based on the total weight of the polyethylene.

The modifier can be added into the reaction mixture in any suitable way. It may be comprised in the polymerization initiator composition. Alternatively, the modifier may be injected into the monomer feed, such as into the inlet pipes feeding the secondary compressor. As the modifier is, in general, not fully consumed during one pass through the reactor, it is generally also present at a certain amount in the recycle ethylene returning to the secondary compressor.

Comonomer

The process of the invention may not only be used for the manufacture of ethylene homopolymers, but also of ethylene copolymers. Such comonomer(s) will be pressurized and injected into the primary and/or secondary compressor and then fed into the polymerization reactor together with ethylene.

Typical comonomers include, without limitation: vinyl ethers such as vinyl methyl ether, vinyl n-butyl ether, vinyl phenyl ether, vinyl beta-hydroxy-ethyl ether, and vinyl dimethylamino-ethyl ether; olefins such as ethylene, propylene, butene-1, cis-butene-2, trans-butene-2, isobutylene, 3,3-dimethylbutene-1,4-methylpentene-1, hexane-1, octene-1, and styrene; vinyl-type esters such as vinyl acetate, vinyl butyrate, vinyl pivalate, and vinylene carbonate; haloolefins such as vinyl fluoride, vinylidene fluoride, tetrafluoroethylene, vinyl chloride, vinylidene chloride, tetrachloroethylene, and chlorotrifluoroethylene; acrylic-type esters such as methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3,-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, beta-hydroxyethyl methacrylate, beta-hydroxpropyl methacrylate, 3-hydroxy-4-carbo-methoxy-phenyl methacrylate, N,N-dimethylaminoethyl methacrylate, t-butylaminoethyl methacrylate, 2-(1-aziridinyl)ethyl methacrylate, diethyl fumarate, diethyl maleate, and methyl crotonate; other acrylic-type derivatives such as acrylic acid, methacrylic acid, crotonic acid, maleic acid, methyl hydroxy, maleate, itaconic acid, acrylonitrile, fumaronitrile, N,N-dimethylacrylamide, N-isopropylacrylamide, N-t-butylacrylamide, N-phenylacrylamide, diacetone acrylamide, methacrylamide, N-phenylmethacrylamide, N-ethylmaleimide, and maleic anhydride; and other compounds such as allyl alcohol, vinyltrimethylsilane, vinyltriethoxysilane, N-vinylcarbazole, N-vinyl-N-methylacetamide, vinyldibutylphosphine oxide, vinyldiphenylphosphine oxide, bis-(2-chloroethyl) vinylphosphonate and vinyl methyl sulfide.

Examples of preferred comonomers are vinyl acetate, methyl acrylate, methacrylic acid, ethyl acrylate, butyl acrylate or acrylic acid, or mixture thereof. In some comonomer-containing polyethylenes, the amount of comonomer is below 10 wt %, but may also be 5 wt % or lower, 3 wt % or lower, or even 1.5 wt % or lower. In other comonomer-containing polyethylenes, the amount of comonomer may however be 10 wt % or higher, such as 15, 20, or 30 wt % or higher, depending on the desired end-use of the polymer.

Generally, the purity of the ethylene feed suitable for use in the processes according to the present invention is as provided by state-of-the-art steam crackers. In order not to interfere with the radical initiation reaction, the oxygen content in the feed should be below 5 ppm.

Polymerization Process

In one embodiment of the present invention, a process for high pressure polymerization of ethylene can comprise the steps of: compressing monomer in a primary compressor to an intermediate pressure and then mixing the monomer with recycled monomer and further compressing the monomer in a secondary compressor to the pressure of the reactor upstream of the reactor; introducing the monomer into a high pressure reactor provided with more than one reaction zone; injecting an initiator into the reactor at more than one injection point by at least one injection pump, wherein each injection pump conducts injection at more than one injection point; contacting the monomer in the reactor with the initiator under high pressure polymerization conditions for polymerization to form a product mixture; releasing the product mixture through a high pressure let down valve, cooling the product mixture and separating the product mixture in a separation system having at least two stages into polymer and unreacted monomer; and recycling the unreacted monomer to the secondary compressor.

The process according to the present invention for high pressure polymerization of ethylene, optionally with one or more comonomers, are hereinafter discussed in detail. The reactor used for the high pressure polymerization can be a tubular reactor, an autoclave, or a combination thereof, each having multiple reaction zones. The multiple reaction zones of the reactor allow for manipulation of the temperature profile throughout the polymerization process, which facilitates tailoring of product properties.

Ethylene monomers are supplied to a primary compressor that pressurizes the monomer to an intermediate pressure, preferably of at least about 200 bar (20 MPa), and mixes that monomer with recycled monomer for feed to the secondary compressor. In some existing ethylene tubular reactor plants, the ethylene discharged from the primary compressor is divided into two streams, one stream being combined with recycled monomer and fed to the suction of the secondary compressor, and the other stream being injected into the ethylene/polymer mixture downstream of the high pressure let down valve, thereby providing rapid cooling of the ethylene/polymer mixture prior to entry into the product separation system. In the process of the invention, preferably substantially the entire output of the primary compressor is fed to the secondary compressor. The discharge pressure of the primary compressor is matched to the pressure of the high pressure ethylene recycle system and may be, for example, in the range of from 270 bar (27 MPa) to 350 bar (35 MPa), and is preferably in the range of from 280 bar (28 MPa) to 320 bar (32 MPa). Also, the ethylene monomer is preferably cooled after exit from the primary compressor and prior to entry into the secondary compressor. In a favored embodiment, the primary compressor is a reciprocating compressor having at least eight cylinders, preferably between eight and twelve cylinders.

A secondary compressor located downstream of and in fluid communication with the primary compressor further boosts the feed, including the feed discharged from the primary compressor, to the desired reactor pressure, which is greater than or equal to about 1500 bar (150 MPa), or greater than or equal to about 2000 bar (200 MPa), or greater than or equal to about 2500 bar (250 MPa), or greater than or equal to about 3000 bar (300 MPa), for supply to the high pressure reactor. The interstage pressure, that is, the pressure between the first and second stages of secondary compressor will typically be in the range of 1100 bar (110 MPa) to 1600 bar (160 MPa). Secondary compressors for use with tubular polymerization reactors are typically two-stage reciprocating compressors having, e.g., six or eight cylinders arranged in a compressor frame and having a common crankshaft driven by an electric motor standing at one end of the compressor frame. The temperature of the ethylene monomer should be controlled in order to allow load balancing between the two compressor stages thereby optimizing/maximizing the compressor throughput. Typically the ethylene is cooled between the first and the second stages of compression in the secondary compressor. That may be done by passing the ethylene through tubes provided with a cooling jacket, typically a water jacket.

Other reaction components can be injected into the suction inlet of the secondary compressor along with the ethylene monomer, including one or more other comonomers. One or more modifiers can also be injected into the suction inlet of the second compressor along with the ethylene monomer and one or more comonomers, if available.

The compressed reactor feed stream exiting the secondary compressor can be split into two or more streams. At least one split stream can be heated or cooled in one or more heat exchangers before entering the reactor. Other split streams can be cooled in one or more coolers and introduced to the reactor at different points. The reactor are provided with more than one reaction zone and can also include two or more initiator injection points along its length, if a tubular reactor, or at various zones, if an autoclave. The initiator can be fed to the reactor in the polymerization initiator compositions described herein prepared in a mixing tank prior to being fed into the polymerization reactor, or in situ if both solvent and initiator are being supplied from separate storage tanks and mixed with each other in the line supplying them to the high pressure reactor. The monomer which is introduced into the front end of the reactor is heated to at least 95° C., preferably at least 135° C., or in some cases at least 160° C. in order to promote the decomposition of the initiator and start the polymerization reaction.

In a class of embodiments, the initiator is injected into the reactor at more than one injection point, for example, at least two, at least three, or at least four injection points. Preferably, the initiator is injected into different reaction zones in the same initiator composition. At least one injection pump is employed to inject the initiator and each injection pump is designed to conduct injection at more than one injection point. As a result, rather than at least the same number of injection pumps as that of the injection points, fewer injection pumps than injection points are needed to meet the required initiator supply for the polymerization apparatus and process as described herein. Any suitable pump may be used for injection of initiator, for example, a hydraulically driven piston pump. Total output of the injection pump is controlled by a pump discharge pressure controller. At least two flow control valves are used for each of the injection points. Initiator flow to the injection point is controlled by a temperature controller of the reaction zone acting on the flow control valve in the injection line leading to the reaction zone.

The polymerization reaction can be performed in a high pressure reactor in which monomers, optionally with one or more comonomers, are polymerized in the presence of a polymerization catalyst to form a product mixture comprising polymers and unreacted monomers. Suitable catalyst and catalyst systems are well known in the art. Polymerization commences immediately downstream of the first reaction zone thereby causing the temperature of the reaction mixture to rise due to the exothermic nature of the polymerization. As the temperature rises, initiator decomposition and polymerization increase in rate, accelerating the heat generation and causing the temperature to rise further. As initiator is consumed, initiation and polymerization slow and, at the point where heat generation equals heat conducted away from the reaction mixture, the temperature peaks and then begins to fall. Thus, as the reaction mixture travels along the length of the reactor, the temperature of the reaction mixture increases to a peak and then decreases until the next initiator injection point is reached, whereupon the process begins again. The zones downstream of initiator injection points in which the polymerization reaction occurs are known to the skilled person as reaction zones.

In the embodiment in which the ethylene discharge from the secondary compressor is split into two or more streams, with one stream entering the front end of the reactor and the other stream(s) entering as sidestream(s), the sidestream(s) typically enter(s) the reactor upstream of an initiator injection point, preferably after being cooled, for example, to between 10 and 20° C., before entry into the reactor in order to reduce the temperature of the reaction mixture. The total conversion of monomer to polymer is, in practice, mostly limited by the ability to cool the reaction mixture, so cooling the sidestreams can allow an increase in conversion for a given reactor.

In one embodiment, the high pressure polymerization conditions comprise temperatures from about 120° C. to about 335° C. The peak temperature for each reaction zone will advantageously be in the range of from 200° C. to 350° C. Preferably, in at least one reaction zone the peak temperature will be in the 280° C. to 340° C. range, preferably from 290° C. to 315° C. The increase in temperature in a reaction zone is proportional to the amount of polymer made in that reactor zone and so operating at high peak temperatures favors high conversion. However, the kinetics of ethylene polymerization are such that as the temperature rises, chain transfer to polymer increases relative to propagation of linear chains and the polydispersity index increases, resulting in an increase in the haze value of the polymer produced. Accordingly, when it is desired to manufacture a low haze grade of polymer, it will be necessary to operate at lower peak temperatures. Preferably, in each reaction zone upstream of an initiator injection point (i.e., in all but the last reaction zone) the reaction mixture is cooled to at least 20° C., more preferably to at least 40° C., and most preferably to at least 50° C., below the peak temperature of that reaction zone before the reaction mixture reaches the next initiator injection point.

In another embodiment, the high pressure polymerization conditions include pressures from about 1200 bar (120 MPa) to about 3500 bar (350 MPa). The proportion of the total ethylene which enters the reactor, whether in the front end stream or as a sidestream, which is converted to polymer before exiting the reactor is referred to as the conversion. In the process of the invention, the conversion is at least 28%. The conversion achieved is in part related to the pressure at which the reactor operates, with a higher front end pressure both increasing the rate of polymerization and making possible a greater pressure drop over the length of the reactor. However, operating at higher pressures imposes more strain upon the secondary compressor and also increases the energy consumption with a consequent cost disadvantage. For such reasons, it may be desirable in some instances to operate at a pressure of from 2300 bar (230 MPa) to 2800 bar (280 MPa) at a relatively low conversion, which may be, for example, approximately in the region of from 28% to 32%. Alternatively, it may be desirable to operate at a pressure in the region of 2800 bar (280 MPa) to 3100 bar (310 MPa) at a high conversion, for example, in the range of from 32% to 37%. However, pressure is only one of the factors which influence conversion and overall a conversion in the region of from 30% to 40% is preferred, with a more preferred range being from 30% to 37%.

Tubular Reactor

A tubular reactor is a continuous, plug flow loop reactor. In a preferred embodiment where the reactor is a tubular reactor, the tubular reactor usually has an initial part to which the monomer(s) are fed from the secondary compressor and wherein they are heated to the desired reaction start temperature, usually to at least about 120° C., preferably at least about 135° C., or in some cases even to at least about 160° C. Once the desired temperature is reached, polymerization initiator composition is injected to start the reaction. The pressure in the tubular reactor is generally from about 2100 bar (210 MPa) to about 3500 bar (350 MPa).

In the process of the present invention, polymerization is carried out in a tubular reactor having at least three reaction zones, each reaction zone commencing at an initiator injection point. The injected initiator decomposes into free radicals, which start the polymerization. Further points for injecting the initiator composition are located downstream along the length of the reactor. Preferably, the reactor has a total of at least two, preferably at least three, more preferably at least four distinct injection points, thereby giving rise to at least two, at least three, or at least four, respectively, reaction zones. In each reaction zone the polymerization is conducted as previously described herein. In a preferred embodiment, the tubular reactor will generally be equipped with at least one temperature regulated cooling jacket in each reaction zone. The reaction mixture in any reaction zone can be cooled by the cooling jacket through which water or another cooling fluid is circulated or a combination of the cooling jacket and introduction of a sidestream of cooled ethylene monomer.

The maximum internal diameter of the tubular reactor of the invention is preferably at least 65 mm in order to keep the pressure drop over the length of the reactor to an acceptable level. In the embodiment in which a portion of the ethylene discharged from the secondary compressor enters the tubular reactor as sidestreams, it will be desirable for the reactor to have regions of differing internal diameter increasing in stages down the length of the reactor as sidestreams enter. For example, for a process having a secondary compressor throughput of around 160 tonnes/hour at 3000 bar (300 MPa), 20% of which enters the front end of the tubular reactor and the rest enters as sidestreams, the tubular reactor may initially have a diameter in the range of 35 mm to 40 mm, and at the entry point of the first sidestream the internal diameter will increase, the increase being dependent on the size of that sidestream, and so on until after the last sidestream, the final internal diameter is in the region of 75 mm to 80 mm. The particular maximum internal diameter of a tubular reactor chosen for any process according to the invention will be dependent upon the throughput of the secondary compressor, on the output pressure from the secondary compressor and on the length of the tubular reactor employed, all of which relate to the pressure drop experienced over the length of the reactor. The tubular reactor preferably has a length in the 1500 m to 5000 m range, more preferably from 3000 m to 4500 m.

In the process of polymerizing ethylene in a tubular reactor, once the desired throughput of ethylene through the secondary compressor and into the reactor is established, the pressure in the reactor is controlled by the high-pressure, let-down valve, through which the product mixture exits the reactor. Opening the valve decreases pressure in the tubular reactor; closing the valve increases the pressure. Moreover, a pressure drop exists along the length of the tubular reactor which forces the reaction mixture along the reactor at a desired velocity (the term "reactor pressure" herein refers to the maximum pressure in the reactor, that is, the pressure immediately downstream of the secondary compressor, unless another meaning is obvious from the context). The pressure drop over the length of the reactor is dependent on the condition that the pressure should not fall below the point at which phase separation for the reaction mixture occurs. The pressure drop for a given throughput can be reduced by increasing the internal diameter of the tubular reactor. However, increased tube diameter also makes effective cooling of the reactor mixture more difficult.

Autoclave Reactor

The high pressure polymerization process as described herein can also be conducted in an autoclave reactor. The autoclave reactor is usually a cylinder-shaped continuous stirred tank reactor (CSTR) with an agitator to promote good mixing, with a residence time of about 20 to 60 seconds. The ethylene and optionally comonomer(s) are fed into the reactor at one or more points, and so is the polymerization initiator composition. If desired, additional modifier may be added, either together with the monomer feed, separately or as part of the polymerization initiator composition.

Also the autoclave reactor may have several reaction zones with different, increasing polymerization temperatures. The reaction zones can be divided from each other e.g. by means of baffles within the reactor. Within each such stage, internally or externally operated stirrers provide for back-mixing of the reaction mixture, but back-mixing between these stages is usually avoided. The pressure in the autoclave reactor is generally from about 1200 bar (120 MPa) to about 2100 bar (210 MPa).

Product Separation and Re-Cycle

The heated reactor (both tubular and autoclave) effluent contains polymer, unreacted monomer(s), residual transfer agent, if any, and residual organic solvent (initially used to dissolve the initiator). Upon exiting from the reactor, the above reactor effluent, hereinafter referred to as "the product mixture", can pass through a downstream high pressure let down valve, which lowers the pressure of the product mixture so that the product mixture is no longer in the single phase and starts to form two phases, a monomer rich phase with unreacted monomer(s) and a polymer rich phase. The high pressure let down valve can be controlled to maintain the desired pressure in the reactor.

In a number of existing tubular reactor facilities, part of the ethylene discharge from the primary compressor is cooled and diverted in a separate stream to a location immediately downstream of the high pressure let down valve (ethylene quench), to act as a rapid quench cooling of the product mixture. Preferably, however, all of the ethylene discharged from the primary compressor is conducted into the secondary compressor and subsequently into the tubular reactor, in order to maximize the amount of polymer produced and alternative means are provided for cooling the product mixture. The combination of high throughput and the factors mentioned above relating to pressure drop over the length of the reactor make it undesirable in the process of the invention to provide more cooling capacity in the last reaction zone than is necessary to control the polymerization exotherm in the last reaction zone. Preferably, the temperature of the product mixture at the high-pressure, let-down valve is in the range of from 260 to 290° C. Accordingly, downstream of the high pressure let down valve and upstream of the product separator, further cooling means is provided.

From the high pressure let down valve, the product mixture can flow through a jet pump and then into a separation system having at least two stages that can include one or more high pressure separation ("HPS") vessels and one or more low pressure separation ("LPS") vessels. In the first stage where the product mixture is fed into an HPS vessel operating at a pressure below the pressure at the reactor outlet, e.g. at least about 200 bar (20 MPa), preferably at least about 250 bar (25 MPa), the first separation of polymer from unreacted ethylene is carried out. The separated gas is fed to the high pressure recycle system for return to the secondary compressor. The polymer-enriched liquid effluent of the HPS vessel is optionally fed into a medium pressure separation (MPS, see WO 2007/134670 and co-pending application PCT/US2008/087501) vessel which operates at pressures between the HPS and the LPS vessels discussed below, thus e.g. at between about 10 bar (1 MPa) and about 250 bar (25 MPa). After the MPS (or directly after the HPS) the polymer-rich liquid is fed into an LPS vessel which works at a pressure lower than that of the MPS and HPS vessels, thus lower than about 20 bar (2 MPa), preferably lower than 10 bar (1 MPa), and most preferably lower than about 1 bar (0.1 MPa). Separation between ethylene and optional monomers, such as vinyl acetate, occurs in the LPS vessel. The overhead from the LPS vessel is recycled back to the primary compressor. Part of the overhead gas of the LPS vessel is sent to outside battery limits for purification, thereby limiting the build-up of impurities in the system. The molten polymer exiting the LPS vessel is then charged to a conventional extruder, where it is combined with conventional additives to modify the properties of the extruded polymer, and then to a pelletizer for finishing.

FIG. 1 depicts an embodiment of a high pressure polymerization system 1 comprising a tubular reactor 5 with a conventional initiator injection scheme where one injection pump injects initiators into one reaction zone through one injection point. Ethylene feed line 2 supplies ethylene monomer to a primary compressor 3 that pressurizes the ethylene to a pressure of about 200 bar (20 MPa) to about 350 bar (35 MPa). The outlet of the primary compressor 3 communicates through a conduit having a valve with the inlet of a secondary compressor 4. The secondary compressor 4 boosts the reaction feed, which includes the ethylene feed discharged from the primary compressor 3 and other reaction components, to a pressure of about 3000 bar (300 MPa). The compressed reaction feed exiting the secondary compressor 4 can be split into two streams, one of which enters the front end of a tubular reactor 5 and the other being split into one or more sidestreams which enter the tubular reactor 5 at points along its length. The tubular reactor 5 is provided along its length with two reaction zones (5a and 5b) and two initiator injection points which are fed from an initiator injection system 6.

In the initiator injection system 6, one injection pump is used to inject the initiator into a reaction zone through one injection point, i.e. the injection pump 6a injecting the initiator 6i into the reaction zone 5a and the injection pump 6b injecting into the reaction zone 5b. The output of each pump is controlled by a temperature controller (15a and 15b) of the reaction zone.

From the tubular reactor 5 the exiting mixture of polymer and unreacted monomer passes through a high pressure let down valve 7 that can be controlled to maintain the desired pressure in the tubular reactor 5. From the high pressure let down valve 7, the product mixture can flow through a jet pump and then into a separation system that can include one HPS vessel 8 and one LPS vessel 9. The HPS vessel 8 can separate the product mixture into a stream of unreacted monomer gas 10 and a polymer rich liquid 11. The separated monomer gas can be directed to a recycle gas system 12. The recycle gas system 12 can include one or more waste heat boilers, one or more coolers for cooling the recycle gas, and one or more knock-out pots for dewaxing. The cooled and dewaxed gas exiting the recycle gas system 12 can flow back to the reactor feed of the secondary compressor 4. The polymer rich liquid 11 can be further separated in the LPS vessel 9. The LPS vessel 9 can operate at a pressure of from about 0.5 bar (0.05 MPa) to about 2.0 bar (0.2 MPa). Molten polymer leaves the LPS vessel 9 via an outlet in the bottom of that vessel and passes through a conduit into the intake of a hot melt extruder 13 which extrudes the polymer into strings which are chopped, cooled and transferred to product storage bins (not shown). In the LPS vessel 9, at least a portion, if not all, of the remaining monomer is recovered as an off gas that is compressed into a purge gas compressor 14. Any portion of the compressed purge gas can be recycled to the inlet of the primary compressor 3.

Figure 2:
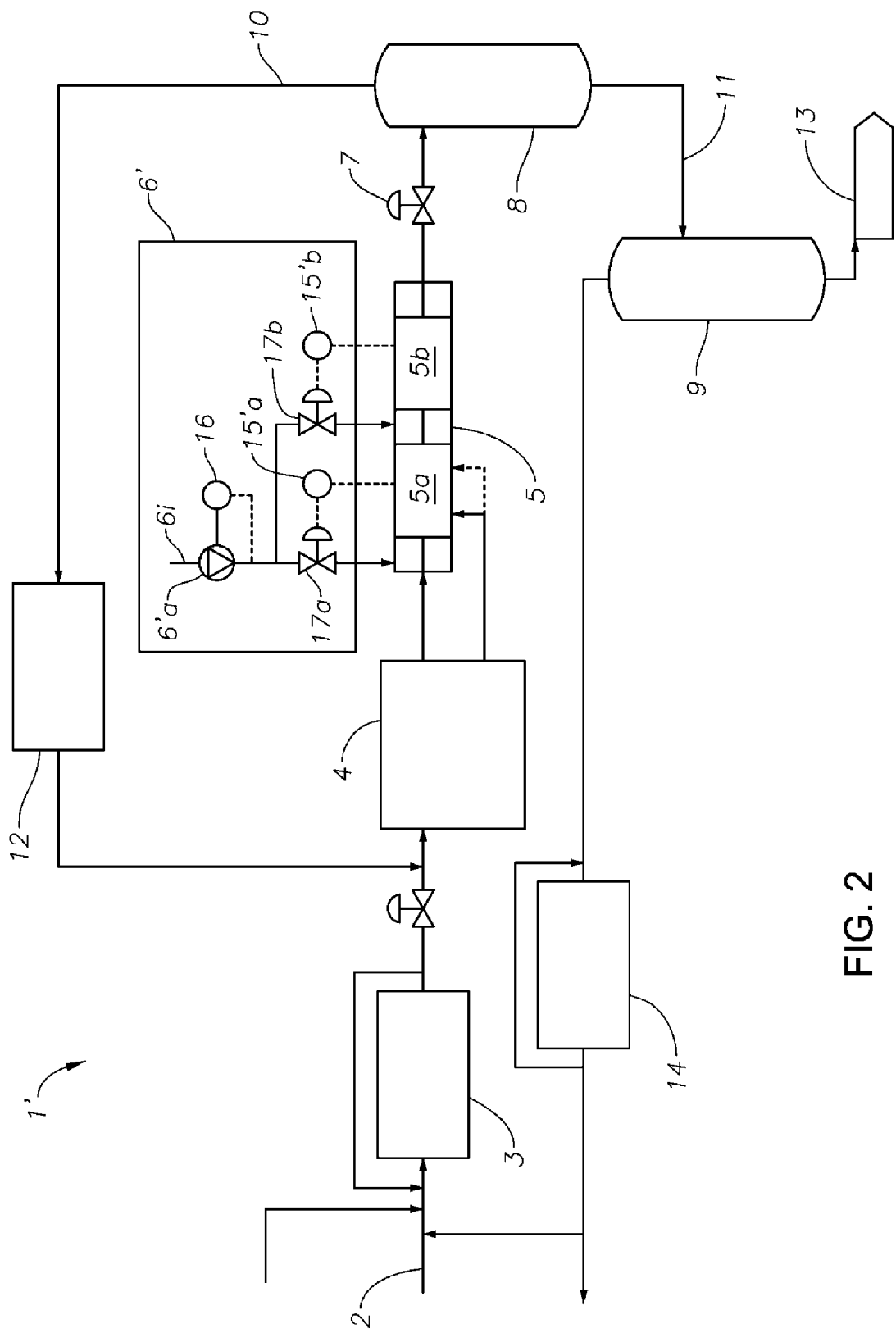
FIG. 2 depicts a schematic representation of a high pressure polymerization system with the inventive initiator injection scheme where one injection pump is designed to inject initiators into more than one reaction zone at more than one injection point.

In comparison with FIG. 1, FIG. 2 depicts an alternative of embodiment of a high pressure polymerization system 1' replacing the conventional initiator injection scheme in FIG. 1 with the inventive initiator injection scheme. In the initiator injection system 6', one injection pump is designed to conduct injection at more than one injection point. It can be seen that the inventive initiator injection scheme used for the same tubular reactor line as FIG. 1 can manage the initiator supply for two reaction zones 5a and 5b with only one injection pump 6'a by operating the injection pump 6'a to simultaneously inject initiators at two respective injection points of reaction zones 5a and 5b. Total output of the injection pump 6'a is controlled by a pump discharge pressure controller 16. Initiator flow to the injection point is controlled by a temperature controller (15'a and 15'b) of the reaction zone acting on the flow control valve (17a and 17b) in the injection line leading to the reaction zone. This design can increase the efficiency of initiator injection and lead to cost saving favored by high pressure polymerization plants.

Polymer Product

The final polymer product (homo-polyethylene or copolymer of ethylene and one or more of the above-listed comonomers, preferably vinyl acetate) produced by the apparatus or according to the process as described herein include a wide range of low density polyethylenes (LDPE) that can be made using radical initiated high pressure processes with tubular or autoclave reactors. Generally, the densities range between about 0.910 and 0.935 g/cm$^3$, the polydispersities between about 5 and about 50, the melt index between about 0.1 and about 500 g/min, and the haze values between about 1 and 20. If desired, high comonomer contents can be realized, e.g. up to about 40 wt % vinyl acetate. The molecular weight of the polymer can be modified by using different types and concentrations of modifier. The polymer density can be influenced by the type and amount of comonomer, and the polymerization temperature. Further, haze can be influenced by the reactor temperature, as well as the reactor pressure and the choice of the polymerization initiator. The main applications of these LDPE grades are in films and in extrusion coating.

Also provided are apparatus for high pressure polymerization of ethylene. An apparatus for high pressure polymerization of ethylene can comprise a high pressure reactor in which monomer is polymerized to form a product mixture comprising polymer and unreacted monomer, wherein the reactor is provided with more than one reaction zone and at least one injection pump for injection of initiator into the reactor, and each injection pump conducts injection at more than one injection point. Preferably, the apparatus further comprises: a primary compressor for compressing monomer to an intermediate pressure and a secondary compressor for compressing the monomer to the pressure of the reactor upstream of the reactor; a high pressure let down valve downstream of the reactor through which the product mixture from the high pressure reactor flows; a separation system downstream of the high pressure let down valve having at least two stages for separating the product mixture into polymer and unreacted monomer; and a recycle system for returning the unreacted monomer to the secondary compressor. Preferably, the reactor is a tubular reactor having at least three reaction zones and being provided with at least one cooling jacket in each reaction zone.

All documents described herein are incorporated by reference herein in their entirety unless otherwise stated. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. An apparatus for high pressure polymerization of ethylene, comprising a high pressure reactor in which monomer is polymerized to form a product mixture comprising polymer and unreacted monomer, wherein the reactor is provided with more than one reaction zone and one or more injection pumps in fluid connection with the reactor, wherein each one of the one or more injection pumps fluidly connects to the reactor at multiple injection points;

and further wherein each respective injection point of the multiple injection points (a) is configured to provide initiator to a corresponding reaction zone of the more than one reaction zones; and (b) is provided with (b-1) a flow control valve and (b-2) a temperature controller of said corresponding reaction zone, said flow control valve and temperature controller being configured such that initiator flow to the respective injection point is controlled by the temperature controller acting on the flow control valve.

2. The apparatus of claim 1, wherein total output of each injection pump is controlled by a pump discharge pressure controller.

3. The apparatus of claim 1, wherein the reactor is a tubular reactor, an autoclave reactor, or a combination thereof.

4. The apparatus of claim 1, wherein the reactor is a tubular reactor having at least three reaction zones and is provided with at least one cooling jacket in each reaction zone.

5. The apparatus of claim 4, wherein the tubular reactor has a maximum internal diameter of at least 65 mm.

6. The apparatus of claim 1, further comprising:
a primary compressor for compressing monomer to an intermediate pressure and a secondary compressor upstream of the reactor, wherein the second compressor is configured to compress the monomer to the pressure of the reactor;

a high pressure let down valve downstream of the reactor through which the product mixture from the high pressure reactor flows;

a separation system downstream of the high pressure let down valve having at least two stages for separating the product mixture into polymer and unreacted monomer; and a recycle system for returning the unreacted monomer to the secondary compressor.

7. A process for high pressure polymerization of ethylene in a reactor, comprising the steps of:

compressing monomer in a primary compressor to an intermediate pressure and then mixing the monomer with recycled monomer and further compressing the monomer in a secondary compressor upstream of the reactor, wherein the monomer is compressed in the secondary compressor to the pressure of the reactor;

introducing compressed monomer into the high-pressure reactor, wherein the reactor is provided with more than one reaction zone;

injecting an initiator into the reactor at multiple injection points by one or more injection pumps, wherein each one of the one or more injection pumps conducts injection at multiple injection points;

and further wherein each respective injection point of the multiple injection points (a) provides initiator to a corresponding reaction zone of the more than one reaction zones, and (b) is provided with (b-1) a flow control valve and (b-2) a temperature controller of said corresponding reaction zone, such that flow of initiator to said respective injection point is controlled by the temperature controller acting on the flow control valve;

contacting the monomer in the reactor with the initiator under high pressure polymerization conditions for polymerization to form a product mixture;

releasing the product mixture through a high pressure let down valve, cooling the product mixture and separating the product mixture in a separation system having at least two stages into polymer and unreacted monomer; and recycling the unreacted monomer to the secondary compressor.

8. The process of claim 7, further comprising controlling total output of the injection pump with a pump discharge pressure controller.

9. The process of claim 7, wherein the reactor is a tubular reactor, an autoclave reactor, or a combination thereof.

10. The process of claim 7, wherein the reactor is a tubular reactor having at least three reaction zones and is provided with at least one cooling jacket in each reaction zone.

11. The process of claim 7, wherein the initiator is an oxygen or organic free-radical initiator.

12. The process of claim 7, wherein polymerization conditions in the reactor comprise temperatures from about 120° C. to about 335° C., and pressures from about 1200 bar (120 MPa) to about 3500 bar (350 MPa).

13. The process of claim 7, further comprising injecting at least one modifier into the secondary compressor along with the monomer.

14. The process of claim 7, wherein ethylene is the only monomer present and the polymer is an ethylene homopolymer.

15. The process of claim 7, wherein one or more comonomers is present and the polymer is an ethylene copolymer.

16. The process of claim 15, wherein the one or more comonomers is vinyl acetate, methyl acrylate, methacrylic acid, ethyl acrylate, butyl acrylate, acrylic acid, or mixtures thereof.

* * * * *